United States Patent
Rau et al.

(10) Patent No.: US 9,828,780 B2
(45) Date of Patent: Nov. 28, 2017

(54) DISTRIBUTION BOOM FOR STATIONARY OR MOBILE VISCOUS MATERIAL PUMPS

(71) Applicant: Putzmeister Engineering GmbH, Aichtal (DE)

(72) Inventors: Benjamin Rau, Leinfelden-Echterdingen (DE); Eva Daum, Filderstadt (DE); Dietmar Fügel, Wolfschlugen (DE)

(73) Assignee: Putzmeister Engineering GmbH, Aichtal (DE)

( * ) Notice: Subject to any disclaimer, the term of this patent is extended or adjusted under 35 U.S.C. 154(b) by 0 days.

(21) Appl. No.: 15/428,584

(22) Filed: Feb. 9, 2017

(65) Prior Publication Data

US 2017/0152668 A1 Jun. 1, 2017

Related U.S. Application Data

(63) Continuation of application No. PCT/EP2015/067473, filed on Jul. 30, 2015.

(30) Foreign Application Priority Data

Aug. 12, 2014 (DE) .................. 10 2014 215 947

(51) Int. Cl.
*F16L 5/02* (2006.01)
*E04G 21/04* (2006.01)
(Continued)

(52) U.S. Cl.
CPC ........ *E04G 21/0445* (2013.01); *B23K 31/027* (2013.01); *E04G 21/0427* (2013.01);
(Continued)

(58) Field of Classification Search
CPC .......... Y10T 137/8807; E04G 21/0445; E04G 21/0427; F04G 21/0436; F16L 5/022; B23K 31/027
See application file for complete search history.

(56) References Cited

U.S. PATENT DOCUMENTS

| 4,034,876 A | 7/1977 | Yancey |
| 4,924,898 A * | 5/1990 | Evenson ................... E03F 7/10 137/565.3 |

(Continued)

FOREIGN PATENT DOCUMENTS

| CN | 203113801 U | 8/2013 |
| DE | 198 27 010 A1 | 1/2000 |

(Continued)

OTHER PUBLICATIONS

English translation of International Preliminary Report on Patentability and Written Opinion of the International Searching Authority, PCT/EP2015/067473, dated Sep. 26, 2016.

*Primary Examiner* — Kevin Lee
(74) *Attorney, Agent, or Firm* — Bose McKinney & Evans LLP

(57) ABSTRACT

This disclosure relates to a distribution boom for stationary or mobile viscous material pumps, comprising at least one boom arm having a box profile. The boom arm has two side walls which are arranged at a distance from one another and which are connected to one another by means of two transverse walls which are arranged at a distance from one another. Each side wall has a lead-through opening for a conveying line. Provision is made according to this disclosure for there to extend between the side walls a tube which is fixedly connected thereto and which opens by way of the tube ends thereof into the lead-through openings. Between the tube ends and the adjacent side wall there is arranged a respective flange which projects in an encircling manner (Continued)

over an outer border of the respective tube end and is welded both to the tube end and to the side wall in question.

13 Claims, 3 Drawing Sheets

(51) Int. Cl.
 *B23K 31/02* (2006.01)
 *B23K 103/04* (2006.01)
(52) U.S. Cl.
 CPC .......... *E04G 21/0436* (2013.01); *F16L 5/022* (2013.01); *B23K 2203/04* (2013.01); *Y10T 137/8807* (2015.04)

(56) References Cited

U.S. PATENT DOCUMENTS

| | | | |
|---|---|---|---|
| 9,512,628 B2* | 12/2016 | David et al. | ........ E04G 21/0427 |
| 2015/0136266 A1 | 5/2015 | David et al. | |
| 2015/0275532 A1* | 10/2015 | Fugel et al. | ........ E04G 21/0445 248/65 |

FOREIGN PATENT DOCUMENTS

| | | |
|---|---|---|
| DE | 10 2012 213 729 A1 | 2/2014 |
| EP | 0 838 563 A1 | 4/1998 |
| GB | 2 132 676 A | 7/1984 |
| JP | S 55-155866 A | 12/1980 |
| WO | WO 2014/029516 A1 | 2/2014 |

\* cited by examiner

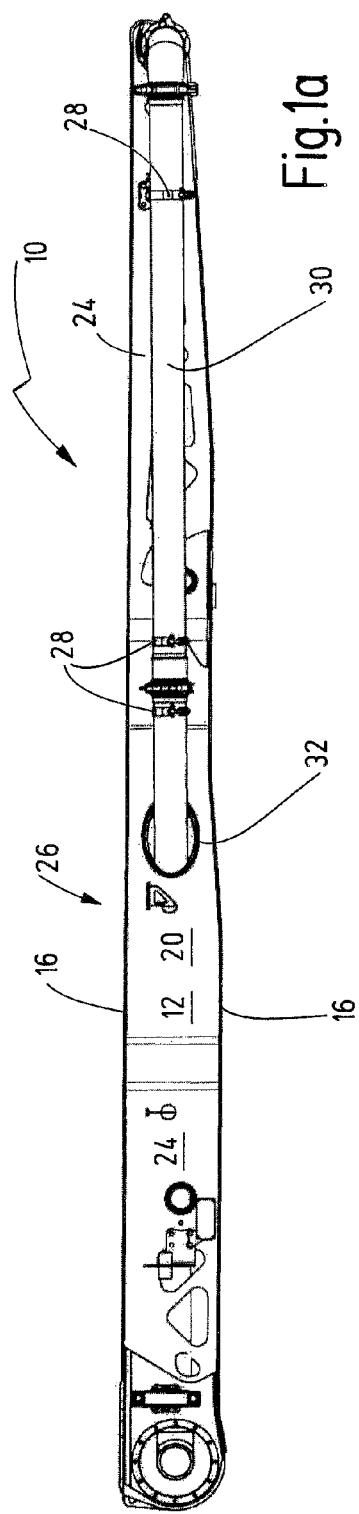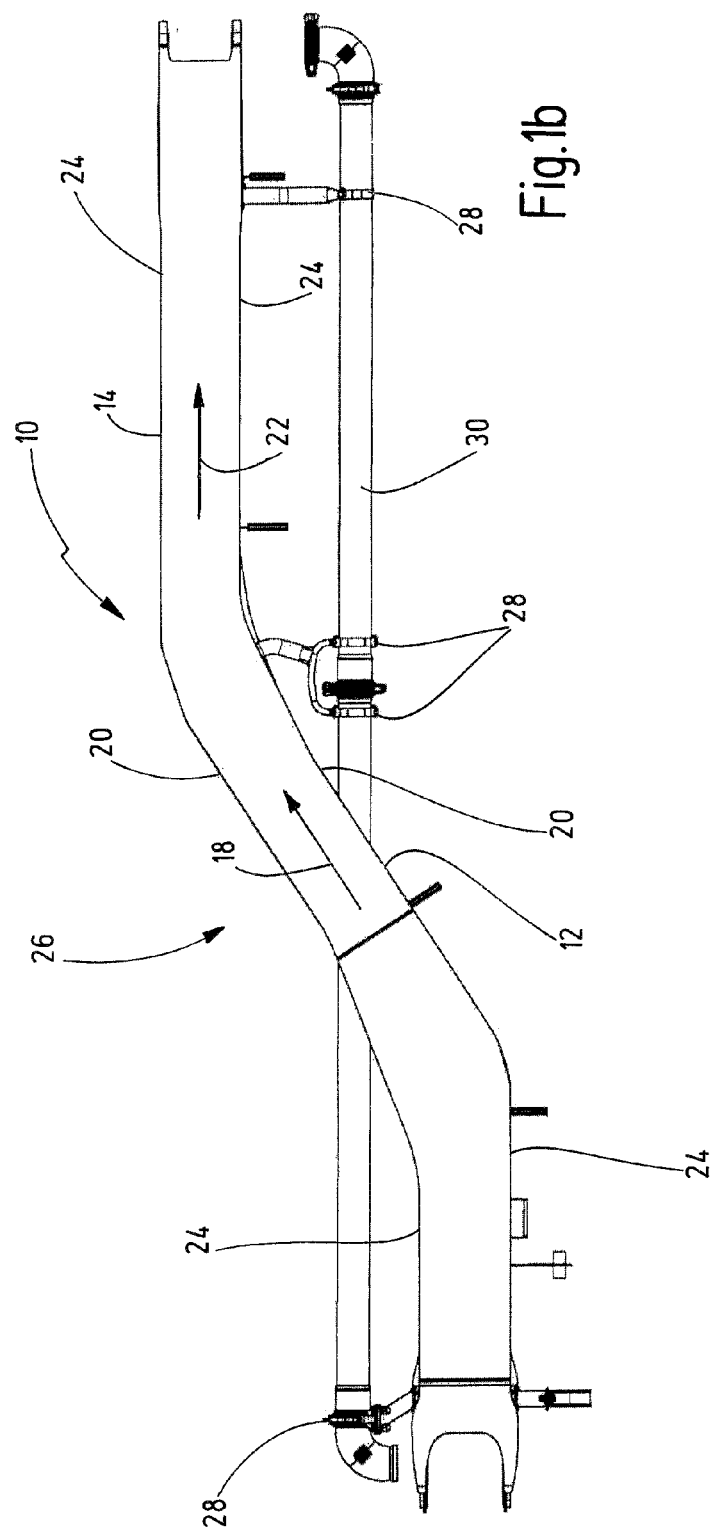

DISTRIBUTION BOOM FOR STATIONARY OR MOBILE VISCOUS MATERIAL PUMPS

RELATED APPLICATIONS

This application is a continuation of PCT/EP2015/067473, filed Jul. 30, 2015, which claims priority to DE 10 2014 215 947.4, filed Aug. 12, 2014, both of which are hereby incorporated herein by reference in their entireties.

BACKGROUND

This disclosure relates to a distribution boom for stationary or mobile viscous material pumps, comprising at least one boom arm having a box profile, which boom arm has two spaced apart side walls connected to each other by means of two spaced apart transverse walls, and comprising a conveying line, which is guided along the at least one boom arm and is fastened thereto, wherein each side wall of the boom arm has a lead-through opening for the conveying line.

A concrete distributing boom for stationary and mobile concrete pumps of this type is known (U.S. Publication No. 2015/0136266 A1). There the boom arms are configured, primarily for weight reasons, as a box profile. Guided in a regular manner along such a distribution boom is a conveying line, with which liquid concrete is conducted as viscous material to a remote location reached by the boom tip. In many specific applications, it is here necessary that the conveying line crosses the boom arm. This can be realized by guiding the conveying line past the boom arm, which is complex, however, in terms of design. In addition, it is known to provide the boom arm with lead-through openings on its two mutually opposite side walls and to guide the conveying line through the lead-through openings. In order to prevent rainwater from making its way inside the boom arm, a tube is guided through the lead-through openings, which tube receives the conveying line and, protruding on both sides of the boom arm, is fixedly welded to the side walls by means of a fillet weld seam. The making of a fillet weld is complex. Due to the size of a typical boom arm, the weld seam has to be made by hand, which increases the production cost.

SUMMARY

This disclosure teaches a distribution boom of the type defined in the introduction that can be more easily produced.

This disclosure is based on the notion of not connecting the tube directly to the side walls, as previously, but instead of arranging on each of its tube ends a flange, which projects in full circle over the outer border of the tube end. Since the tube is relatively small in comparison to a typical boom arm, a prewelded assembly consisting of the tube and the flanges can be produced in an automated manner by means of a welding robot. The prewelded assembly can then, prior to the joining together of the side walls with the transverse walls, be fastened with its flanges to the side walls, in particular with a circumferential weld seam, which seals off the boom arm against the penetration of rainwater in the region of the lead-through openings. Any weakening which the boom arm suffers due to the lead-through openings on the side walls is at least partially compensated by the prewelded assembly, so that the boom arm penetrated by the conveying line is sufficiently rigid.

An advantageous embodiment of this disclosure provides that the flanges respectively bear against that inner surface of the particular side wall which faces the other side wall. The weld seams connecting the flanges to the side walls are then particularly easy to produce. The flanges additionally reinforce the side walls weakened in the region of the pass-through opening.

Another preferred embodiment of this disclosure provides that at least one of the flanges has a circumferential lip, which juts into the particular lead-through opening. The lip can then be connected to the peripheral rim of the particular lead-through opening, with the formation of a full connection which lends the hollow body additional stability in this region. For this purpose, the peripheral rim of the lead-through opening receiving the lip is advantageously provided with a bevel, so that the lead-through opening widens in the direction of the outer surface facing away from the inner surface. The full connection is in this case V-shaped in cross section and, due to the gap which becomes larger in the direction of the outer surface, can be fitted particularly easily between the lip and the peripheral rim of the lead-through opening.

In addition, it is possible for at least one of the flanges to be connected to the adjacent side wall by means of a fillet weld. As a result, at such places at which no great requirements are placed upon the stability of the connection, material savings can be made by omitting the lip. In this case, the fillet weld is easily made in full circle on a rim of the flange, which rim protrudes inward over the peripheral rim of the lead-through opening.

Advantageously, the flanges respectively have an outer contour having at least one straight portion. The straight portion here serves for better orientation with respect to the associated side wall, since, in the assembly process, it is arranged parallel to an edge of the side wall.

The advantages of this disclosure particularly come to bear when the lead-through openings are disposed in first portions of the side walls and are mutually offset in the longitudinal direction of these, which first portions run parallel to one another in the longitudinal direction. Typically, the first portions of the side walls are adjoined by further portions of the side walls, which further portions at their two ends run parallel to each other in a further longitudinal direction, so that a crank, through which the conveying line is guided, is formed in the boom arm. The further longitudinal direction here defines a longitudinal extent of the boom arm, in which also the, in this case, rectilinear conveying line extends.

In principle, it is also possible in the manner of a geometric reversal that the side walls of the boom arm run in a straight line over the whole of the longitudinal extent, and that the conveying line is in this case cranked such that it penetrates the side walls obliquely in a central region.

According to this disclosure a prewelded assembly, the tube of which is provided with flanges which are welded onto the two tube ends and project over the outer border of the tube end, is proposed, wherein the tube preferably has the form of a cylinder cut at an acute angle to its longitudinal axis.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein:

FIGS. 1a, 1b show a boom arm with fed-through conveying line in a side view and in top view;

DESCRIPTION

Figure 2:
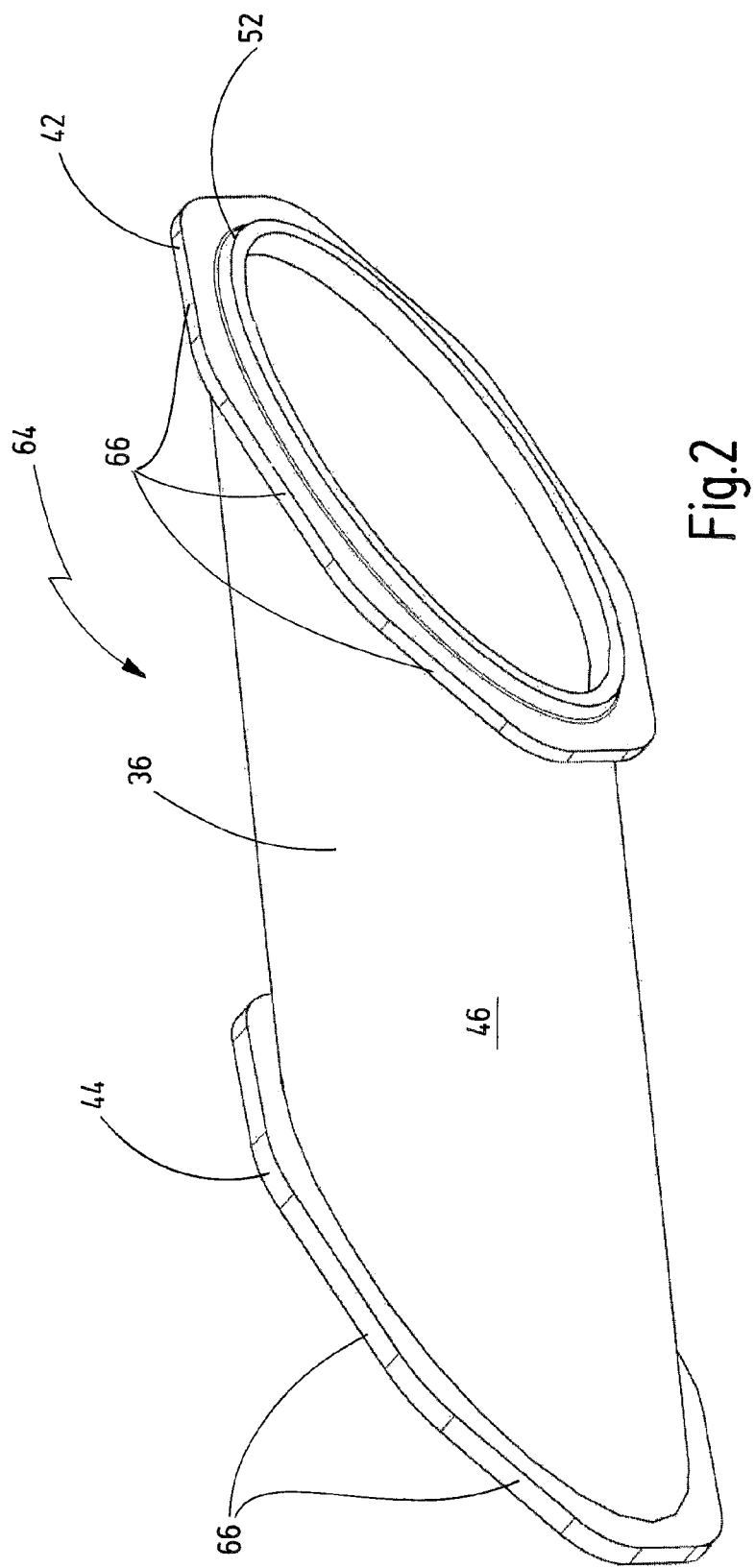
FIG. 2 shows a prewelded assembly consisting of a tube and two flanges.
Figure 3:
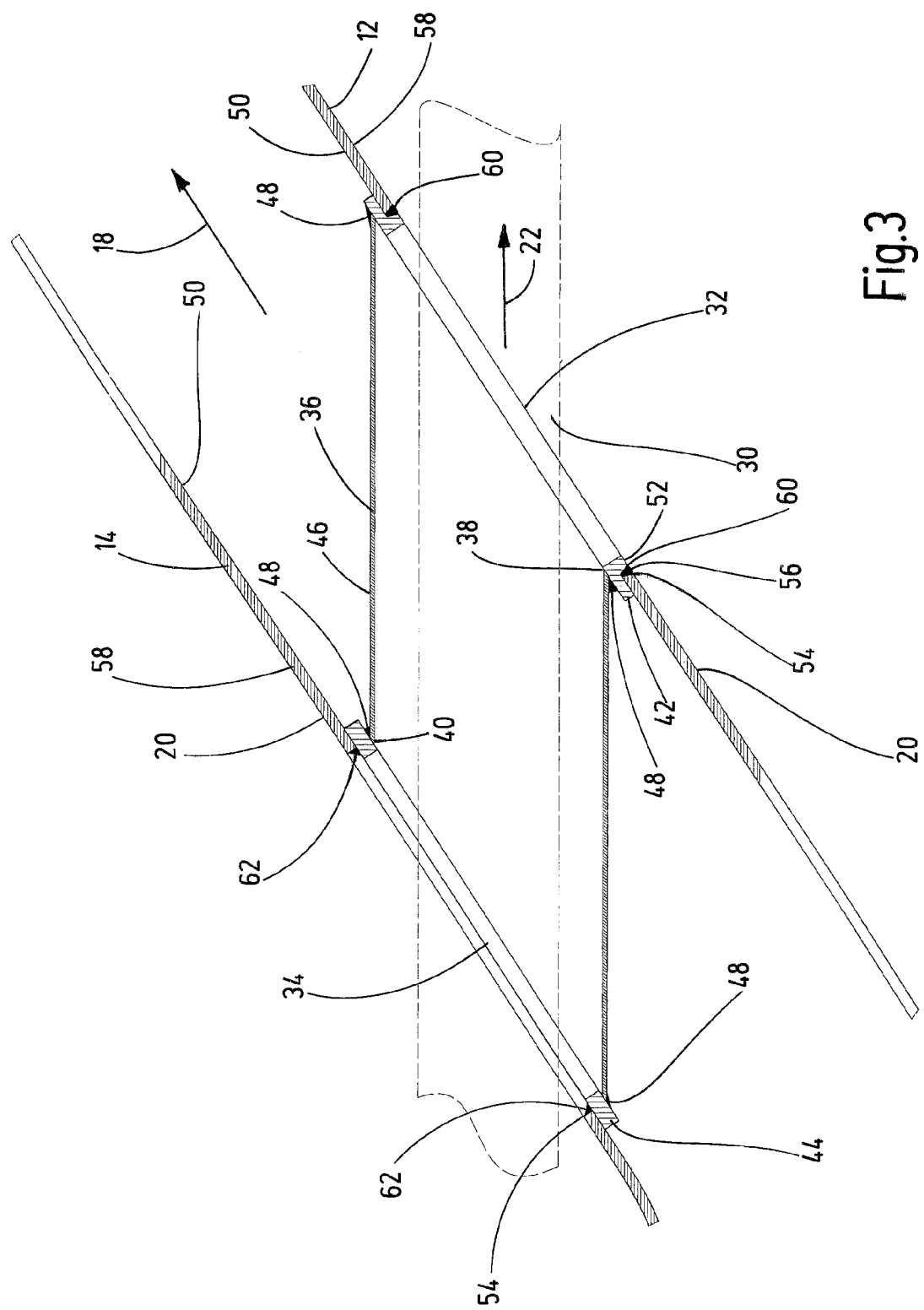
FIG. 3 shows a schematic longitudinal section through the boom arm according to FIGS. 1a, 1b in the region of the prewelded assembly.

The embodiments described below are not intended to be exhaustive or to limit the invention to the precise forms disclosed in the following description. Rather, the embodiments are chosen and described so that others skilled in the art may appreciate and understand the principles and practices of this disclosure.

As noted above, the terms "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular," "circular," "circle" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "boom arm," "side wall," "flange," to name only a few, should be interpreted when appearing in this disclosure and claims to mean "one or more" or "at least one." All other terms used herein should be similarly interpreted unless it is made explicit that a singular interpretation is intended.

The boom arm 10, which is represented in FIG. 1a, b and has a box profile and which is intended for a multi-armed distribution boom of a stationary or mobile concrete pump, has two side walls 12, 14 made of fine-grained structural steel, as well as two transverse walls 16, likewise made of fine-grained structural steel, which connect the side walls 12, 14 one to the other. The side walls 12, 14 respectively have a first portion 20 extending in a longitudinal direction 18, as well as further portions 24, which adjoin the two ends of the first portion 20 and extend in a further longitudinal direction 22. The longitudinal direction 18 and the further longitudinal direction 22 enclose an acute angle, so that the first portions 20 of the side walls 12, 14 form a crank 26. Fastened to the boom arm 10 by means of tube clamps 28 is a rectilinear concrete conveying line 30, which extends in the further longitudinal direction 22. In the region of the crank 26, the conveying line 30 penetrates the boom arm 10. For this purpose, each of the side walls 12, 14 has a lead-through opening 32, 34, which are arranged mutually offset in the longitudinal direction 18.

The conveying line 30 is guided through a tube 36, which is disposed in the crank 26 and the tube ends 38, 40 open out into the lead-through openings 32, 34. The tube can be formed of a conventional structural steel. Onto each of the tube ends 38, 40 is welded a flange 42, 44, which respectively projects in full circle over the tube outer surface 46 in the region of the tube end 38, 40, i.e., the flanges project as a circle over the outer border thereof. The flanges 42, 44 are connected to the tube 36 by means of fillet welds 48 and respectively bear full-facedly against an inner surface 50 of the associated side wall 12, 14. A first of the two flanges 42, which is disposed between a first of the two tube ends 38 and a first of the two side walls 12, additionally has a lip 52 jutting into a first of the two lead-through openings 32. Moreover, the first lead-through opening 32 has on its peripheral rim 54 a bevel 56, so that it widens in the direction of the outer surface 58 facing away from the inner surface 50 of the first side wall 12. In the region between the lip 52 and the peripheral rim 56 is disposed a weld seam configured as a full connection 60. The full connection 60 stabilizes the first portion 20 of the first side wall 12, which is of advantage in particular because said first portion is facing toward the boom tip, in the region of which higher torsional forces are at play. At the opposite end of the tube 36, the second flange 44 connected to the second tube end 40 is configured without a lip jutting into the second lead-through opening 34 and is connected to the peripheral rim 56 of the second lead-through opening 34 via an encircling weld seam configured as a fillet weld 62.

In the manufacture of the boom arm, a prewelded assembly 64 formed of the tube 36 and the flanges 42, 44 is firstly made (FIG. 2). The cylindrical tube 36 is here cut to length in mutually parallel planes, which enclose with the cylinder center axis an acute angle which corresponds to the acute angle between the first portions 20 of the side walls 12, 14 and the further portions 24. Next the flanges 42, 44 are welded onto the tube ends 38, 40. These respectively have the outline of a polygon with rounded corners, so that their outline has a plurality of straight portions 66, which facilitate a positioning on the respective lead-through opening 32, 34, since they can be oriented parallel to an edge of the respective side wall 12, 14. The finished prewelded assembly 64 is connected to the side walls 12, 14 before the box profile of the boom arm is completely closed in the region of the crank 26.

In summary, the following can be stated: this disclosure relates to a distribution boom for stationary or mobile viscous material pumps, comprising at least one boom arm 10 having a box profile. The boom arm 10 has two spaced apart side walls 12, 14, which are connected to each other by means of two spaced apart transverse walls 16. Each side wall 12, 14 has a lead-through opening 32, 34 for a conveying line 30. According to this disclosure, it is provided that running between the side walls 12, 14 is a tube 36, which is fixedly connected to these and opens out with its tube ends 38, 40 into the lead-through openings 32, 34. Between the tube ends 38, 40 and the adjacent side wall 12, 14 is respectively disposed a flange 42, 44, which projects in full circle over an outer border of the respective tube end 38, 40 and is welded both to the tube end 38, 40 and to the particular side wall 12, 14.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

REFERENCE SYMBOL LIST 10 boom arm
12, 14 side walls
16 transverse walls 18 longitudinal direction
20 first portion
22 further longitudinal direction
24 further portion
26 crank
28 tube clamp
30 conveying line
32, 34 lead-through openings
36 tube
38, 40 tube ends
42, 44 flanges
46 tube outer surface
48, 62 fillet weld
50 inner surface
52 lip
54 peripheral rim
56 bevel
58 outer surface
60 full connection
64 prewelded assembly
66 straight portions

What is claimed is:

1. A distribution boom for stationary or mobile viscous material pumps, comprising:
 a boom arm having a box profile, the boom arm having two spaced side walls connected to each other by two spaced transverse walls, the side walls being parallel to one another and defining a first portion of the boom arm having a longitudinal direction;
 a conveying line disposed along and fastened to the boom arm;
 each side wall having a lead-through opening for the conveying line, the lead-through openings being offset in the longitudinal direction and being oriented parallel to the longitudinal direction;
 a tube disposed between and secured to the side walls, the tube having tube ends that open into the lead-through openings;
 a first flange disposed between one of the tube ends and one of the side walls, and a second flange disposed between the other one of the tube ends and the other side wall, the flanges projecting as a circle over an outer periphery of the respective tube ends, each flange being welded to the respective tube end and respective side wall.

2. The distribution boom as claimed in claim 1, wherein each flange is connected to the respective tube end and to the respective adjacent side wall by a circumferential weld seam.

3. The distribution boom as claimed in claim 1, wherein each flange bears against an inner surface of the respective adjacent side wall which faces the other side wall.

4. The distribution boom as claimed in claim 1, wherein at least one of the flanges has a circumferential lip which juts into the respective lead-through opening.

5. The distribution boom as claimed in claim 4, wherein the lip is welded to a peripheral rim of the respective lead-through opening.

6. The distribution boom as claimed in claim 5, wherein the peripheral rim has a bevel, wherein the lead-through opening widens in an outward direction.

7. The distribution boom as claimed in claim 1, wherein at least one of the flanges is welded to a respective one of the side walls with a fillet weld.

8. The distribution boom as claimed in claim 1, wherein each flange has an outer contour having at least one straight portion.

9. The distribution boom as claimed in claim 1, wherein the two side walls define two further portions of the boom arm, the two further portions being disposed parallel to one another and extending along a further longitudinal direction.

10. The distribution boom as claimed in claim 9, wherein the conveying line extends in the further longitudinal direction.

11. The distribution boom as claimed in claim 1, wherein the conveying line is disposed contactlessly through the tube.

12. The distribution boom as claimed in claim 1, wherein the tube ends are cut at an acute angle and extend in the longitudinal direction.

13. A method for manufacturing a distribution boom as claimed in claim 1, comprising:
 welding one of the flanges to one end of the tube and welding the other flange to the other end of the tube and thereby forming a pre-welded assembly;
 welding the pre-welded assembly to the sidewalls; and then joining the sidewalls together.

* * * * *